INVENTORS
DONALD L. BIANCHETTA
JOHN A. JUNCK
JOSEPH KOKALY
BY
ATTORNEYS

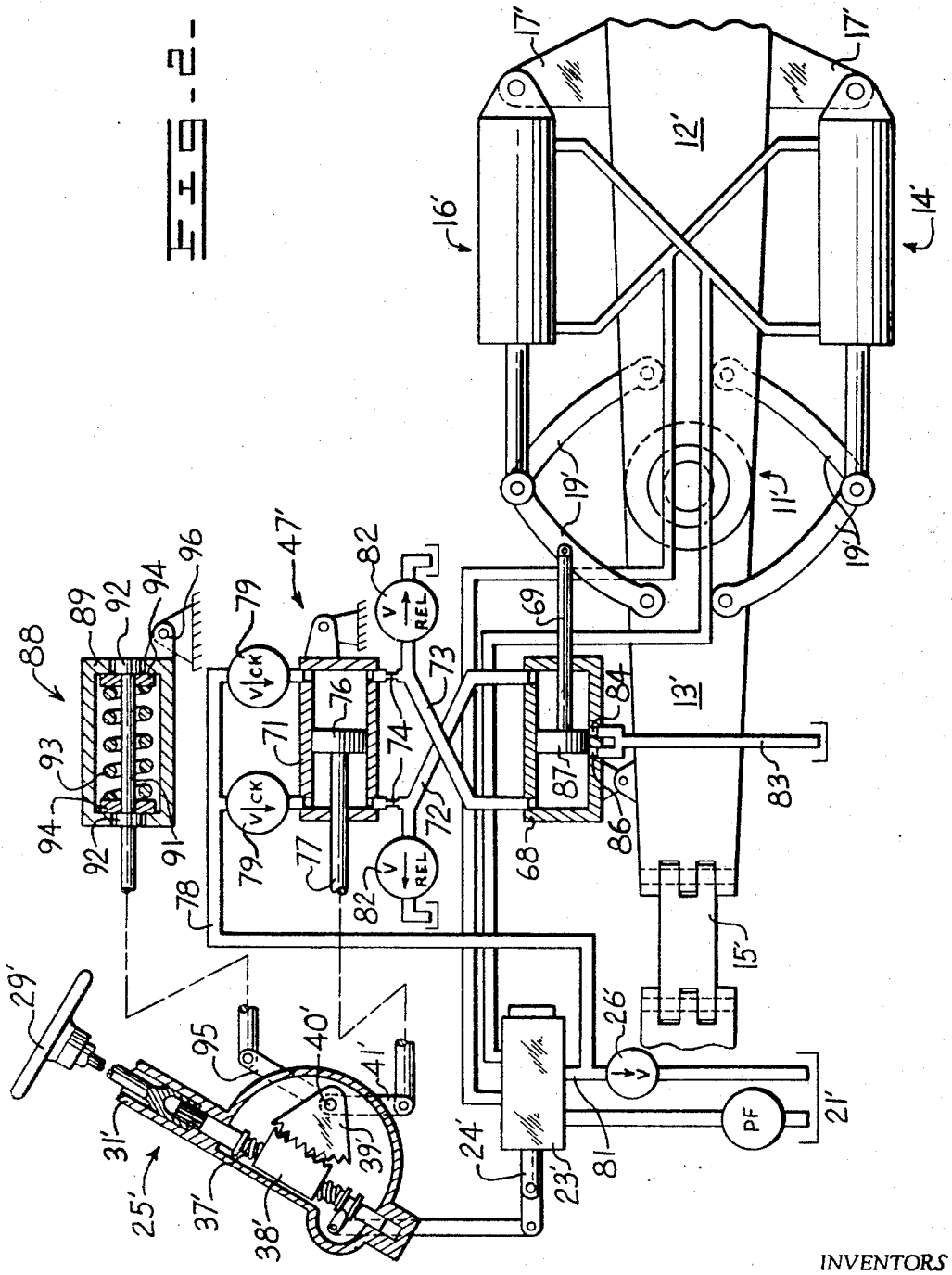

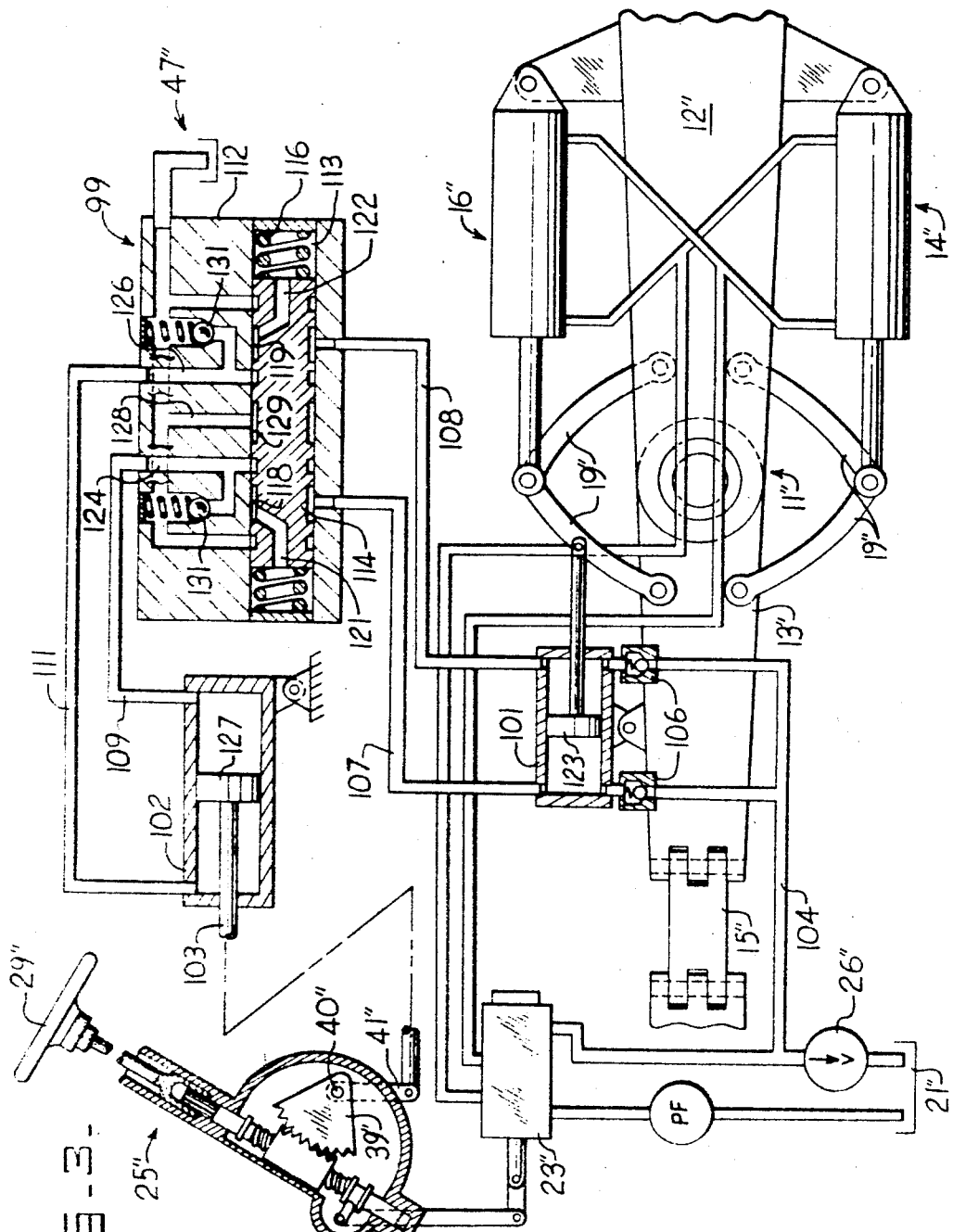

United States Patent Office 3,444,948
Patented May 20, 1969

1

3,444,948
HYDRAULIC FOLLOW-UP FOR VEHICLE STEERING SYSTEMS
Donald L. Bianchetta, Coal City, and John A. Junck and Joseph Kokaly, Joilet, Ill., assignors to Caterpillar Tractor Co., Peoria, Ill., a corporation of California
Filed Feb. 1, 1967, Ser. No. 613,253
Int. Cl. B62d 5/00; F15b 13/16
U.S. Cl. 180—79.2                   8 Claims

ABSTRACT OF THE DISCLOSURE

Pivoting of one portion of a vehicle relative to the other for steering purposes is effected by hydraulic jacks controlled with a steering wheel. A hydraulic circuit feedback system senses the pivoting movement and deactivates the jacks when turning of the steering wheel ceases so that the operator may steer the vehicle by manipulating the wheel in a conventional manner.

Background of the invention

This invention relates to vehicle steering systems of the class operated by fluid powered jacks and more particularly to follow-up mechanisms which adapt such systems for control through normal manipulation of a steering wheel.

Certain forms of powered vehicle are most efficiently steered through hydraulic controls rather than by means of a direct mechanical linkage between the steering wheel and the riding wheels or other traction devices. Articulated vehicles of the class having two body sections with a pivot therebetween are customarily controlled in this manner. Such vehicles, which may variously be tractors, loaders, scrapers or the like, usually have a pair of hydraulic jacks connected between the two body sections with each of the jacks being on a separate side of the pivot connection therebetween. Steering is accomplished by extending one jack while simultaneously contracting the other to force pivoting at the joint.

To control the jacks in this type of system, it is customary to utilize a conventional steering wheel which operates a valve connected between the jacks and a source of high pressure driving fluid. Turning of the steering wheel in a particular direction opens the valve to supply fluid to the head end of one jack and the rod end of the other.

In the absence of a follow-up system, the vehicle cannot be controlled by manipulating the steering wheel in the conventional manner. When the control valve which actuates the jacks has been opened by turning the steering wheel, the jacks will continue to extend and contract causing the turning radius of the vehicle to continually decrease. This progressively tighter turning of the vehicle can only be stopped by returning the steering wheel to its initial position. This closes the valve at which point the vehicle will continue to make a constant radius turn as determined by the degree of extension and contraction of the jacks at the time the valve closes. In order to end the turn, the steering wheel must then be rotated in the opposite direction to reverse operation of the jacks after which the steering wheel must again be returned to the initial position.

This mode of control, known as jerk steering, differs substantially from the conventional steering wheel manipulations associated with a mechanical steering gear. In the latter, the turning radius remains constant when the operator stops rotating the steering wheel and the turn is completed by simply restoring the steering wheel to its initial position. In comparison with the conventional steering wheel manipulations, jerk steering is much more

2 difficult and is not conductive to precision guiding of the vehicle.

To avoid the need for involved steering wheel manipulations, a negative feed-back means in the form of a mechanical follow-up linkage is customarily used. Such linkages sense the pivoting of the vehicle body sections and respond by continually attempting to restore the control valve to its closed position at which the turning jacks will be inactivated. Under this condition, the jacks can operate only while the steering wheel is actually in the process of being turned by the operator. Once the steering wheel ceases to turn, the follow-up linkage succeeds in closing the control valve and inactivates the jacks. The mechanism thus simulates the action of a conventional mechanical steering gear in that the turning radius of the vehicle remains constant as soon as rotation of the steering wheel is stopped.

The follow-up systems as heretofore designed have included some form of mechanical linkage extending from the control valve, which is generally near the steering column, to the region of the pivot connection between the two sections of the vehicle. Pivoting movement between the two vehicle body sections is mechanically transmitted to the control valve where it is caused to urge the valve towards a closed position while the turning of the steering wheel is simultaneously moving the valve towards an open position.

Under certain conditions mechanical follow-up linkages are subject to design complications and operational problems. The steering control valve may be situated at a remote location from the vehicle pivot joint or at a point where a reasonably direct mechanical connection between the two locations may be difficult to provide for. Most notably, there may be looseness or play between the points connected by the followup linkage with the result that false turning signals are generated. These may seriously interfere with the operator's control of the vehicle. The problem is particularly pronounced in the case of articulated vehicles having cushion or spring hitches in which the coupling between certain sections of the vehicle, which must be spanned by the follow-up linkage, is deliberately designed to provide for some relative movement therebetween.

Summary of the invention

The present invention resolves the problems discussed above by replacing the mechanical follow-up linkage with hydraulic motion transmitting means. A master hydraulic cylinder situated near the vehicle pivot joint detects operation of the steering jacks and transmits a fluid pressure signal, preferably through flexible hoses, to a slave cylinder situated near the steering control valve. In response to such signals, the slave cylinder urges the valve control towards the closed position to provide the desired follow-up action.

Maintenance of steering control is extremely important for safety reasons as well as others and for this purpose the invention provides mechanism for insuring continued control in the event of leakage or outright rupture of the hydraulic lines. In extreme cases, involving massive fluid loss, the mechanism provides for reverting to jerk steering without interference from the follow-up system.

Accordingly it is an object of this invention to provide follow-up mechanism for a hydraulically operated steering system which is less subject to spurious signals, more adaptable to diverse vehicle constructions, and which provides more precise and reliable operation.

Brief description of the drawings

In the accompanying drawings.

FIGURE 2 is a schematic view of a vehicle steering system employing a second embodiment of the invention; and FIGURE 3 is a schematic view of a vehicle steering system utilizing a third embodiment of the invention.

*Description of the preferred embodiments*

Figure 1:
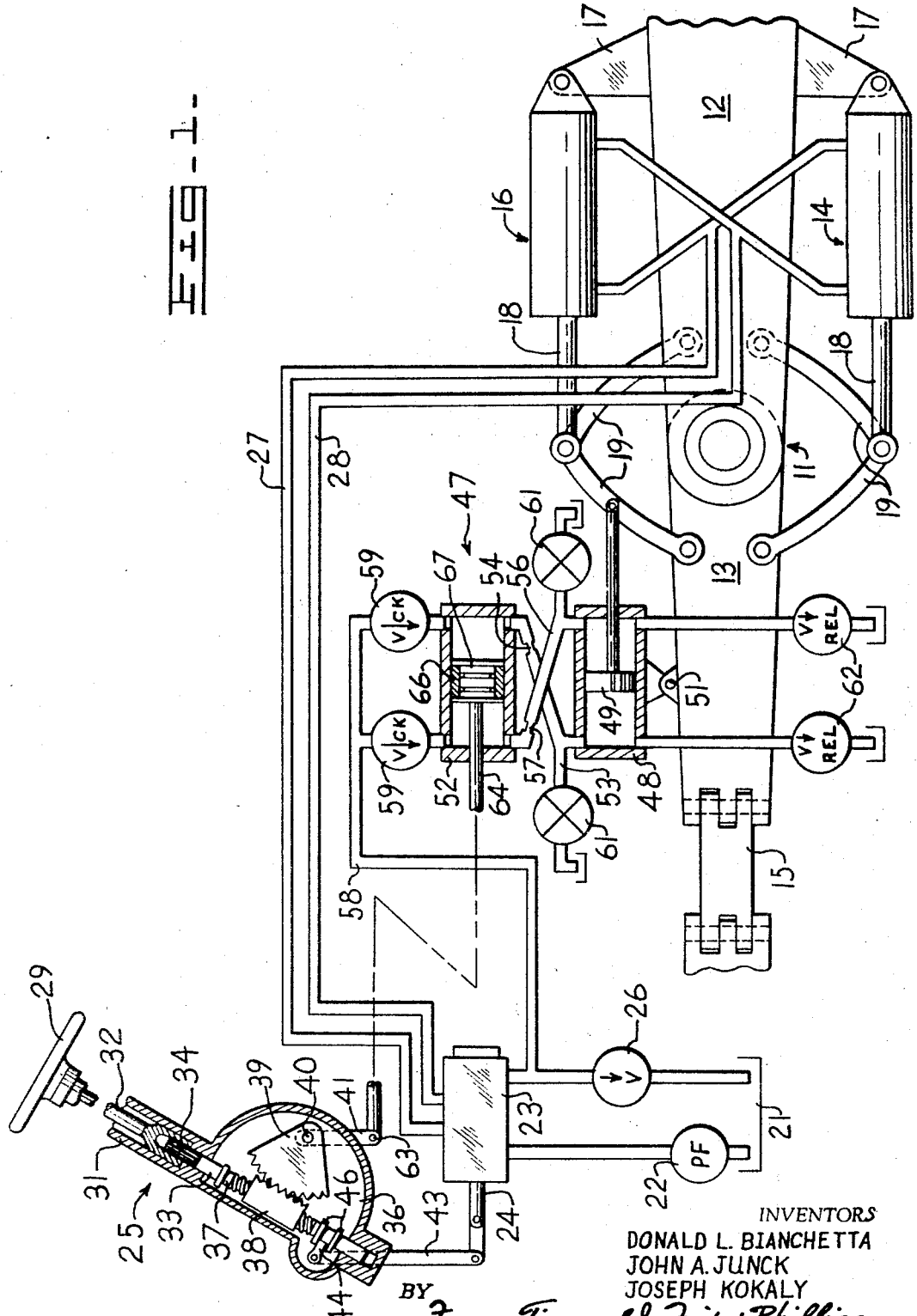
FIGURE 1 is a schematic view of a hydraulic steering system for an articulated vehicle having a first embodiment of the invention therein.

Referring now to FIGURE 1 there is shown a pivot or kingpin hitch 11 between component members 12 and 13 of an articulated vehicle body. For purposes of example, the members 12 and 13 are here shown as components of a tractor scraper of the general type disclosed in copending application Ser. No. 461,887, filed June 7, 1965, now U.S. Patent 3,311,389 by James C. Barton et al. and entitled System for Control of Pitch and Bounce in Tractor Trailer Combinations. Conventional mechanical follow-up linkages are particularly troublesome in this form of vehicle due to the presence of a cushion hitch 15 at member 13. The hitch 15 provides for limited relative movement between sections of the vehicle which must be spanned by the follow-up linkage and thus can cause spurious turning signals. It should be understood that the invention is equally applicable to the diverse other forms of vehicle, such as tractors, trucks, loaders, and the like which are steered by forcibly pivoting one member of the vehicle relative to the other about a pivot point such as the kingpin joint 11.

The forced pivoting for steering purposes is accomplished by means of a pair of double acting hydraulic jacks 14 and 16 which are in effect coupled between the two members 12 and 13 with each jack being on a separate side of the joint 11. Each jack 14 and 16 may be pivoted at the head end to a one of a pair of arms 17 which project sidewardly from member 12 and the extensible rod 18 of each jack is pivoted to one of a pair of links 19 at the corresponding side of the hitch 11. The opposite ends of each pair of links 19 are pivotably connected to members 12 and 13 respectively at opposite sides of the hitch 11. Thus contraction of one of the jacks 14 and 16 accompanied by extension of the other jack will pivot member 12 relative to member 13 in a first direction while reversed motion of the jacks will pivot the member 12 in the opposite direction.

To control the jacks 14 and 16 and thereby steer the vehicle, a high pressure hydraulic fluid such as oil is selectively supplied to the jacks from a reservoir 21 by a pump 22 coupled to the intake of a steering control valve 23. Valve 23 may be of the general type disclosed in U.S. Patent No. 3,154,921, issued Nov. 3, 1964 and entitled Fluid Pressure System and Control, which has a control element 24 that may be moved axially between three valve positions. At a first such position the oil supplied to the valve 23 by the continuously operating pump 22 is returned directly to the reservoir 21 through an additional valve 26 of the class which maintains a constant predetermined pressure at the inlet side thereof. The first valve position, which is a closed position insofar as the steering jacks 14 and 16 are concerned, occurs at an intermediate position of the valve spool control element 24. At a second position of valve 23 hydraulic fluid is directed to the head end of steering jack 14 and the rod end of the second steering jack 16 through a branched conduit 27 thereby effecting turning of member 12 relative to member 13 about the pivot joint 11. At the third position of valve 23 hydraulic fluid under pressure is similarly delivered to the rod end of jack 14 and the head end of jack 16 through a second branched conduit 28 thereby effecting a pivoting movement about joint 11 in the opposite direction. Thus steering of the vehicle is accomplished by an appropriate axial positioning of the valve control element 24.

While various different forms of control structure may be provided to enable the vehicle operator to manipulate the valve control element 24, it is generally most satisfactory to utilize a conventional steering wheel 29 as the terminal element in the linkage. A steering column assembly 25 provides connecting structure between the steering wheel 29 and valve element 24 and may include a hollow steering column housing 31 with a rotatable steering shaft 32 projecting axially from the upper end thereof and having the steering wheel 29 mounted coaxially thereon. A second shaft 33 is disposed within the lower portion of housing 31 in alignment with shaft 32 and is both rotatable and movable in an axial direction.

Shaft 33 is coupled to shaft 32 through a spline connection 34 so that the lower shaft 33 is rotated by turning of wheel 29 while being capable of movement in an axial direction within housing 31. Housing 31 has an enlarged section forming a chamber 36 and a portion of the section of shaft 33 which extends therethrough is provided with threads 37 with an internally threaded sleeve 38 being engaged thereon. Sleeve 38 carries a gear rack which engages a gear sector 39. The gear sector 39 is pivoted within chamber 36 on a shaft 40 which also carries an arm 41 which extends in a generally downward direction. Thus if gear sector 39 is held in a fixed position, thereby holding sleeve 38 stationary, turning of the steering wheel 29 acts to move the lower shaft 33 in an axial direction within housing 31 with the direction of the shaft movement being dependent upon the direction of turning of the steering wheel. Such movement of the shaft 33 is transmitted to the steering valve control 24 by a jointed linkage 43 which has a fork 44 pivoted to the enlarged portion of housing 31 and engaging the lower portion of the shaft 33 between a pair of flanges 46 thereon. Linkage 43 is proportioned so that the valve 23 is held at its intermediate or closed position when the steering wheel 29 is in its normal position. Accordingly, rotation of the steering wheel 29 moves the valve control 24 and actuates the steering jacks 14 and 16 to turn the vehicle in a first direction and rotation of the wheel 29 in the opposite direction moves the valve control to the other open position to produce a reverse operation of the steering jacks.

As hereinbefore discussed, the steering system as described to this point cannot be operated by manipulating the steering wheel 29 in the conventional manner but instead would require resorting to the less convenient jerk steering technique. To avoid this requirement and to simulate the steering action of a conventional system, the present invention provides a hydraulic follow-up system 47.

Basically the follow-up system 47 functions to detect pivoting motion about the joint 11 and to feed this motion back to the steering valve control element 24 in such a way as to tend to restore the valve 23 to the closed position thereof. The follow-up system 47 cannot succeed in closing valve 23 as long as the steering wheel 29 continues to be turned inasmuch as such turning is continually opening the valve and opening of the valve is a precondition to operation of the follow-up system. However when the steering wheel 29 is no longer being turned, the follow-up system 47 succeeds in closing valve 23 and thereby stops continued actuation of the steering jacks 14 and 16. Insofar as the vehicle operator's manipulation of the steering wheel 29 is concerned, this effect is similar to that of a conventional steering system.

The follow-up system 47 is formed by a master cylinder 48 having, in this instance, a head end pivoted to vehicle member 13 and a rod pivoted to the linkage 19 which connects the steering jacks 14 and 16 with the goose neck members 12 and 13. Accordingly, pivoting movement of members 12 and 13 causes a contractive or extensive movement of the piston 49 within the master cylinder 48. In order to avoid spurious follow-up signals from movements at the cushion hitch 15, the pivotable connection 51 between master cylinder 48 and member 13 is situated at a portion of member 13 which is rigidly connected with the end of the member at the king pin joint 11.

Motion of the piston 49 within master cylinder 48 is transmitted hydraulically to a slave cylinder 52 situated near the steering column housing 31. For this purpose the head end of master cylinder 48 is communicated with the head end of slave cylinder 52 through a conduit 53 having a flow restriction 54 therein and the opposite or rod end of master cylinder is communicated with the rod end of slave cylinder 52 through an additional conduit 56 also having a flow restriction 57. Thus a contractive movement of master cylinder 48 produces an extension movement of slave cylinder 52 and extension of the master cylinder is accompanied by contraction of the slave cylinder.

Hydraulic fluid from reservoir 21 is supplied to both ends of the slave cylinder 52 through a conduit 58 connected between control valve 23 and the previously described constant pressure inlet valve 26. For this purpose, the oil supply conduit 58 has a pair of branches which communicate with the opposite ends of slave cylinder 52 through separate check valves 59 which prevent flow in a direction away from the cylinder.

Oil for the master cylinder 48 is transmitted thereto through the hereinbefore described conduits 53 and 56 which connect corresponding ends of the two cylinders. The effect of the flow restrictions 54 and 57 in conduits 53 and 56 respectively is to provide a safety factor in that if a leak should develop in one of the lines an immediate loss of a substantial amount of oil is prevented enabling the operator to steer the vehicle in a normal manner for a period of time sufficient to avoid possible hazards. Further measures for increasing reliability of the system include bleed valves 61 at each of the conduits 53 and 56, which connect the master and slave cylinders, for purging air or other contamination from the hydraulic lines. To avoid over pressures, each end of the master cylinder 48 is communicated with the hydraulic fluid reservoir 21 through a separate relief valve 62.

The final link in the follow-up system is a pivot connection 63 between the rod 64 of slave cylinder 52 and the previously described pivot arm 41 on gear sector 39 at the steering column assembly 25. Through this connection extension of the slave cylinder 52 acts to lift sleeve 38 and the axially movable steering shaft 37, thereby tending to move the control element 24 of the steering valve towards the closed position at which the steering jacks 14 and 16 are inactivated. Similarly, contraction of the slave cylinder 52 lowers the sleeve 38 and shaft 37 to produce a similar effect at steering control valve 23 when the steering wheel 29 is being turned in an opposite direction.

Thus the general effect of the follow-up system 47 is to forestall continued extension or contraction of the steering jacks 14 and 16 once turning of the steering wheel 29 has ceased thereby simulating the action of a conventional steering system. Should the system fail to operate because of a ruptured hydraulic line or other cause, the operator may still control the vehicle by utilizing the hereinbefore described jerk steer technique in which the steering wheel must be returned to the centered position to stop continued actuation of the steering jacks 14 and 16.

Thus in addition to the previously discussed advantages the follow-up system 47 has a degree of fail safety. This characteristic is further enhanced by a band type brake 66 disposed coaxially on the piston 67 of slave cylinder 52. Brake 66 is always set to apply a fixed pressure between the piston 67 and cylinder 52 that is sufficient to prevent movement of the piston in the event of rupture of a hydraulic conduit line such as conduit 53 or 56. By immobilizing the piston 67 under these conditions, the sleeve 38 within steering column housing 31 is in effect locked at its central position at which the steering wheel 29 may be turned in either direction to effect the emergency jerk steering.

Referring now to FIGURE 2 there is shown a second embodiment of the invention having differing means for assuring continued steerability of the vehicle in the event of oil leakage or rupture of a hydraulic line in the follow-up system 47′ and having a continuous bleed to provide for very precise steering control at all times. The primary vehicle steering mechanism in the embodiment of FIGURE 2, aside from the follow-up system 47′ and certain components connected thereto, may be essentially similar to that hereinbefore described with reference to the first embodiment of FIGURE 1. The structure thus includes vehicle body members 12′ and 13′ which are pivoted relative to each other for steering purposes about a king pin connection 11′. Steering jacks 14′ and 16′ are coupled at one end to a cross member 17′ at vehicle member 12′ and connect to member 13′ through linkage 19′ similar to that hereinbefore described.

Steering jacks 14′ and 16′ are again operated by hydraulic fluid from a reservoir 21′ supplied through a steering control valve 23′ having a control element 24′. Steering valve 23′ is in turn controlled through a steering column assembly 25′ having an axially movable and rotatable threaded shaft 37′ with a sleeve 38′ engaged thereon which is itself engaged by a pivoting gear sector 39′. The several elements of the embodiment of FIGURE 2 described to this point are similar to the correspondingly numbered elements of the first embodiment of the invention and operate in an essentially similar manner.

The modified follow-up system 47′ has a master cylinder 68 pivoted at the head end to member 13′ with the cylinder rod 69 being pivoted to the linkage 19′ which couples the steering jacks 14′ and 16′ to members 12′ and 13′. The pivotable connection between the master cylinder 68 and member 13′ is again situated at a portion of member 13′ which is rigidly connected to the portion of the member that extends to joint 11′ to avoid spurious signals from movement at cushion hitch 15′. Opposite ends of master cylinder 68 are communicated with the corresponding ends of a slave cylinder 71 through flexible hoses 72 and 73 which have flow restrictions 74 adjacent the slave cylinder. Slave cylinder 71 is situated near the steering column assembly 25′ and has a movable piston 76 operating a rod 77 which connects to the arm 41′ that pivots gear sector 39′.

Hydraulic fluid from the intake side of constant pressure valve 26′ is supplied to both ends of the slave cylinder 71 through a branched conduit 78 having a separate check valve 79 in each of the branches which connect with the opposite ends of the slave cylinder. The oil is in turn supplied to both ends of master cylinder 68 through the hereinbefore described conduits 72 and 73 with the flow restrictions 74 therein functioning as previously described to prevent sudden loss of oil from the slave cylinder 71 in the event of a rupture of one of the hoses. To relieve overpressures a relief valve 82 is connected to each of the conduits 72 and 73 which couple to cylinders 68 and 71.

To provide for a continuous bleed within the follow-up system 47 so that no air or other gaseous contaminations can accumulate within the circuitry to interfere with precision operation thereof, a branched drain conduit 83 communicates the central region of master cylinder 68 with the fluid reservoir 21′. The drain or purging conduit 83 communicates with the master cylinder 68 at two slightly separated points 84 and 86 which are at opposite sides of the piston 87 therein when the piston is at its centered position, i.e. when the vehicle members 12′ and 13′ are in alignment. Under this condition, oil is continuously bled from the master cylinder 68 through both openings 84 and 86. When the master cylinder piston 87 moves from its central position during turning of the vehicle one of the openings 84 and 86 is closed so that oil will be forced to the slave cylinder 71 to provide the desired synchronized operation. Such movement of the master cylinder piston 87 leaves the other of the openings 84 and 86 open to relieve oil pressure generated by the accompanying movement of piston 67 in slave cylinder 71.

To insure centering of the piston 76 of slave cylinder 71 when the vehicle is steered back to a straight path, this embodiment of the invention utilizes a two way spring loaded cartridge assembly 88 to apply a centering force to the follow-up system. Cartridge 88 includes a housing 89 through which an axially directed rod 91 extends, the rod being provided with flanges 92 which are normally situated at the opposite ends of the housing. Within housing 89 a compression spring 93 is disposed coaxially around the rod 91 and bears against a pair of spaced apart slidable washers 94 which contact separate ones of the flanges 92.

The spring cartridge housing 89 is coupled to the vehicle frame by a pivot 96 at one end thereof and rod 92 extends from the opposite end of the housing to pivotably connect with a second pivot arm 95 which projects upwardly from the gear sector shaft 40'.

Thus the modified follow-up system 47' accomplishes a result essentially similar to that of the previously described embodiment in that pivoting motion about king pin 11' is detected by master cylinder 68 and transmitted to slave cylinder 71 which functions to turn gear sector 39' in a direction opposing the movement being brought about by turning of the steering wheel 29'. Under normal conditions the pistons 76 and 87 of the cylinders 68 and 71 are restored to the central positions thereof, and are readied for a subsequent cycle of operation, when the steering whele 29' is itself returned to the original position. However, in the absence of the spring cartridge 88, if fluid leakage were to occur between the master cylinder 68 and slave cylinder 71, piston 76 of the slave cylinder would tend to drift towards one end of the cylinder and steering of the vehicle might be interfered with. This effect is avoided in that the centering force produced by the spring 93 of cartridge 88 is sufficiently large to counteract any such imbalance of fluid pressure which might act on the slave cylinder from leakage.

Still other modifications may be employed to provide for purging of the system, to maintain piston synchronization, and to avoid loss of vehicle control in the event of leakage or rupture of a hydraulic fluid hose. A hydraulic steering system is shown in FIGURE 3 with a modified follow-up system 47" which utilizes a form of blocker valve assembly 99 connected between the master cylinder 101 and slave cylinder 102 for these purposes.

The primary steering components of this embodiment of the invention may be essentially similar to those described with reference to the embodiments of FIGURES 1 and 2. Thus vehicle member 12" and 13" are pivoted together at king pin 11" and hydraulic jacks 14" and 16" are coupled therebetween in order to steer the vehicle. The steering jacks 14" and 16" are operated by high pressure hydraulic fluid from a reservoir 21" which is delivered to the jacks through a steering control valve 23" controlled through a steering column assembly 25" having a steering wheel 29".

The modified follow-up system 47" again utilizes a master hydraulic cylnider 101 coupled between member 13" and the linkage 19" at king pin joint 11" to control a slave cylinder 102 which has an extensible rod 103 pivotably coupled to an arm 41" on the gear sector 39" within teh steering column assembly 25". The follow-up system 47" thereby functions to transmit turning motion about king pin 11" back to the steering control valve 23" to achieve results similar to those discussed above with reference to the first two embodiments of the invention.

Hydraulic fluid from reservoir 21" is supplied to both ends of the master cylinder 101 through the steering valve 23" and a conduit 104 which connects to each end of the master cylinder through a separate check valve 106 to prevent any reversed fluid flow. Conduit 104 is coupled to the steering control valve 23' above the inlet side of constant pressure inlet valve 26" to maintain a predetermined fluid pressure within the conduit 104.

The conduits 107 and 108 which connect opposite ends of master cylinder 101 with the corresponding ends of slave cylinder 102 are connected thereto through the blocker valve assembly 99 which is preferably situated in proximity to the slave cylinder and connected thereto by additional conduits 109 and 111 which are in effect short continuations of hoses 107 and 108 respectively.

Blocker valve assembly 99 has a housing 112 with a bore 113 therein and an axially movable spool 114 disposed within the bore. One of a pair of compression springs 116 is situated at each end of spool 114 within bore 113 to exert a centering force on the spool.

Conduits 107 and 108 from the opposite ends of master cylinder 101 connect to housing 112 to communicate with annular grooves 118 and 119 respectively of spool 114, the grooves being on opposite sides of the center thereof. Each of the two grooves 118 and 119 is communicated with the adjacent end of the spool 114 by a pair of passages 121 and 122 respectively. Thus upon a pressure increase in either of grooves 118 or 119, resulting from movement of the piston 123 in master cylinder 101, an axial pressure is exerted upon the spool 114 which then moves off center. Such spool movement communicates either groove 118 or 119 with one of a pair of passages 124 or 126 which connect with conduits 109 and 111 respectively leading to the opposite ends of slave cylinder 102. Depending upon the direction of movement of the piston 123 in master cylinder 101, such movement of the spool 114 connects conduit 107 with conduit 109 or connects conduit 108 with conduit 111 to transmit motion of the master cylinder piston to the piston 127 of the slave cylinder thereby effecting the desired follow-up action as hereinbefore described.

To provide the necessary fluid inflow behind the piston 123 of master cylinder 101 during such movement, one of the check valves 106 opens. It should be noted that this also provides a semicontinuous purging action in the system in that hydraulic fluid is partially circulated through the follow-up system 47' during each operation of the cylinders 101 and 102. To provide for a fluid outflow from one end of slave cylinder 102 as the piston 127 moves therein, a drain passage 128 is provided within housing 99 and communicates with an annular groove 129 around the center of the spool 114. When the spool 114 has been moved axially by operation of the master cylinder 102 as described above, groove 129 communicates the drain passage 128 with the appropriate one of the passages 124 and 126 which connect with the opposite ends of the slave cylinder 102. It should also be observed that this structure constitutes an additional semicontinuous purging mechanism in the system in that some hydraulic fluid is released through drain passage 128 during each operation of the follow-up. To relieve overpressures, a pair of relief valves 131 are situated within housing 99 between passages 124 and 126 and in the drain passage 128.

Relief valves 131 also provide for resynchronization of the slave cylinder piston 121 with the master cylinder piston 123 in the event of loss of synchronization due to system leakage. This is accomplished by jerk steering the machine in a direction to cause the master cylinder piston 123 to move to a position corresponding to that which the slave cylinder piston 121 has assumed because of the leakage. In moving the master cylinder piston, the fluid being expelled is exhausted through one of the relief valves until both pistons are resynchronized whereupon the system again operates in its normal manner.

In operation, the spool 114 is normally centered within bore 113 and thereby isolates the hydraulic hoses 107 and 108 from the slave cylinder 102. Should rupture or leakage occur at either such hose, the piston 127 of slave cylinder 102 will remain effectively locked in position so that steering of the vehicle by the jerk steer method may still be effected. However, the blocker valve 99 does not interfere with the functioning of the follow-up system 47″ under normal conditions inasmuch as spool 114 immediately moves as described above to couple the master and the slave cylinders 101 and 102 respectively for operation as in the previously described embodiments of the invention.

What is claimed is:

1. In a vehicle of the class having a joint between members which may pivot at said joint for steering said vehicle and having at least one fluid operated jack coupled between said members for effecting said pivoting, said vehicle having a valve with a control element for supplying high pressure fluid to said jack and having a steering wheel which may be turned to operate said control element of said valve, a follow-up system comprising,
   a master cylinder coupled between said members for detecting said pivoting movement therebetween, and
   a slave cylinder hydraulically coupled to said master cylinder for synchronized movement therewith, said slave cylinder being coupled to said valve control to move said control in a direction opposite to the movement thereof produced by turning of said steering wheel, said slave cylinder being hydraulically coupled to said master cylinder through means having flow restrictions therein.

2. In a vehicle of the class having a joint between members which may pivot at said joint for steering said vehicle and having at least one fluid operated jack coupled between said members for effecting said pivoting, said vehicle having a valve with a control element for supplying high pressure fluid to said jack and having a steering wheel which may be turned to operate said control element of said valve, a follow-up system comprising,
   a master cylinder coupled between said members for detecting said pivoting movement therebetween,
   a slave cylinder hydraulically coupled to said master cylinder for synchronized movement therewith, said slave cylinder being coupled to said valve control to move said control in a direction opposite to the movement thereof produced by turning of said steering wheel, wherein said slave cylinder has a slidable piston therein which is coupled to said valve control element, and
   means acting to hold said slidable piston at a centered position in said slave cylinder against pressure imbalances therein which are of less magnitude than the pressure imbalance generated therein by operation of said master cylinder.

3. The combination defined in claim 2 wherein said means is a brake operative between said piston and said slave cylinder to prevent movement of said piston in the presence of fluid pressure imbalances in said slave cylinder of less than a predetermined magnitude.

4. In a vehicle of the class having a joint between members which may pivot at said joint for steering said vehicle and having at least one fluid operated jack coupled between said members for effecting said pivoting, said vehicle having a valve with a control element for supplying high pressure fluid to said jack and having a steering wheel which may be turned to operate said control element of said valve, a follow-up system comprising,
   a master cylinder coupled between said members for detecting said pivoting movement therebetween,
   a slave cylinder hydraulically coupled to said master cylinder for synchronized movement therewith, said slave cylinder being coupled to said valve control to move said control in a direction opposite to the movement thereof produced by turning of said steering wheel,
   a pair of check valves each being communicated with a separate end of one of said cylinders and
   a source of hydraulic fluid under pressure coupled to said separate ends of said cylinder through said check valves.

5. In a vehicle of the class having a joint between members which may pivot at said joint for steering said vehicle and having at least one fluid operated jack coupled between said members for effecting said pivoting, said vehicle having a valve with a control element for supplying high pressure fluid to said jack and having a steering wheel which may be turned to operate said control element of said valve, a follow-up system comprising,
   a master cylinder coupled between said members for detecting said pivoting movement therebetween,
   a slave cylinder hydraulically coupled to said master cylinder for synchronized movement therewith by a pair of fluid conduits which communicate separate ends of said master cylinder with separate ends of said slave cylinder, said slave cylinder being coupled to said valve control to move said control in a direction opposite to the movement thereof produced by turning of said steering wheel,
   a pair of overpressure relief valves each being communicated with a separate one of said conduits, and
   means for bleeding fluid from each of said cylinders.

6. In a vehicle of the class having a joint between members which may pivot at said joint for steering said vehicle and having at least one fluid operated jack coupled between said members for effecting said pivoting, said vehicle having a valve with a control element for supplying high pressure fluid to said jack and having a steering wheel which may be turned to operate said control element of said valve,, a follow-up system comprising,
   a master cylinder coupled between said members for detecting said pivoting movement therebetween,
   a slave cylinder hydraulically coupled to said master cylinder for synchronized movement therewith, said slave cylinder being coupled to said valve control to move said control in a direction opposite to the movement thereof produced by turning of said steering wheel, wherein said slave cylinder has a slidable piston therein which is coupled to said valve control, and
   at least one spring exerting a centering force on said piston of said slave cylinder.

7. In a vehicle of the class having a joint between members which may pivot at said joint for steering said vehicle and having at least one fluid operated jack coupled between said members for effecting said pivoting, said vehicle having a valve with a control element for supplying high pressure fluid to said jack and having a steering wheel which may be turned to operate said control element of said valve, a follow-up system comprising,
   a master cylinder coupled between said members for detecting said pivoting movement therebetween, and
   a slave cylinder hydraulically coupled to said master cylinder for synchronized movement therewith, said slave cylinder being coupled to said valve control to move said control in a direction opposite to the movement thereof produced by turning of said steering wheel, wherein separate ends of said master cylinder are communicated with separate ends of said slave cylinder through a blocker valve which isolates said master cylinder from said slave cylinder except during actuation of said master cylinder, said blocker valve opening to communicate said master and slave cylinders in response to the fluid pressure rise resulting from said actuation of said master cylinder.

8. The combination defined in claim 7 wherein said blocker valve comprises
   a housing having a bore therein and a first pair of passages communicating spaced apart regions of said bore with opposite ends of said master cylinder and having a second pair of passages communicating second spaced apart regions of said bore with opposite ends of said slave cylinder, said housing further having a drain passage, and a slidable spool in said bore, said spool being movable in response to a fluid pressure differential between said first passages to communicate the higher pressure first passage with one of said second passages and to communicate the other of said second passages with said drain, said spool being movable in response to an opposite pressure differential to communicate the other of said first passages with the other of said second passages and to communicate said one of said first passages with said drain.

References Cited

UNITED STATES PATENTS

| | | | |
|---|---|---|---|
| 2,614,644 | 10/1952 | Gufstafson | 180—79.2 |
| 3,150,570 | 9/1964 | Johnson et al. | 92—28 |
| 3,311,389 | 3/1967 | Barton et al. | 280—489 |

FOREIGN PATENTS

| | | |
|---|---|---|
| 1,332,126 | 6/1963 | France. |

BENJAMIN HERSH, *Primary Examiner.*

JOHN A. PEKAR, *Assistant Examiner.*

U.S. Cl. X.R.

91—388